United States Patent [19]

Alnuweiri

[11] Patent Number: 5,526,496

[45] Date of Patent: Jun. 11, 1996

[54] METHOD AND APPARATUS FOR PRIORITY ARBITRATION AMONG DEVICES IN A COMPUTER SYSTEM

[75] Inventor: Hussein M. Alnuweiri, Port Moody, Canada

[73] Assignee: The University of British Columbia, Vancouver, Canada

[21] Appl. No.: 231,310

[22] Filed: Apr. 22, 1994

[51] Int. Cl.⁶ .................................................... H01J 13/00
[52] U.S. Cl. ................................................................ 395/305
[58] Field of Search .................................. 395/325, 725, 395/298, 293, 299, 305

[56] References Cited

U.S. PATENT DOCUMENTS

| | | | |
|---|---|---|---|
| 4,974,148 | 11/1990 | Matteson | 395/325 |
| 5,101,482 | 3/1992 | Kipnis | 395/325 |
| 5,111,424 | 5/1992 | Donaldson et al. | 395/725 |
| 5,121,487 | 6/1992 | Bechtolsheim | 395/325 |
| 5,140,680 | 8/1992 | Best | 395/325 |
| 5,142,672 | 8/1992 | Johnson et al. | 395/500 |
| 5,195,185 | 3/1993 | Marenin | 395/325 |
| 5,239,651 | 8/1993 | Sodos | 395/725 |
| 5,241,601 | 8/1993 | Naito et al. | 380/23 |
| 5,241,628 | 8/1993 | Solari | 395/325 |
| 5,241,632 | 8/1993 | O'Connell et al. | 395/375 |
| 5,241,661 | 8/1993 | Concilio et al. | 395/275 |
| 5,303,382 | 4/1994 | Bush et al. | 395/725 |
| 5,377,332 | 9/1994 | Entwistle et al. | 395/325 |

OTHER PUBLICATIONS

Shlomo Kipnis; Priority Arbitration with Busses; pp. 154–173, 1990.

*Primary Examiner*—Jack B. Harvey
*Assistant Examiner*—Xuong M. Chung-Trans
*Attorney, Agent, or Firm*—Oyen Wiggs Green & Mutala

[57] ABSTRACT

A bus-based apparatus and method for synchronous priority arbitration between modules in a computer system. The modules in the system have priority codes selected from the set B(m,r) of bounded weight codes. Arbitration is completed in, at most, r units of time. The design of the system can be optimized for speed, logic per module, and/or the number of modules connected to any bus line. Both arbitration time and arbitration logic may be decreased by increasing the bus width. The number of modules can be increased indefinitely by increasing only bus-width, while keeping arbitration time and arbitration logic fixed. The arbitration bus is a wired-OR bus.

9 Claims, 5 Drawing Sheets

METHOD AND APPARATUS FOR PRIORITY ARBITRATION AMONG DEVICES IN A COMPUTER SYSTEM

FIELD OF THE INVENTION

This invention relates to a method for arbitrating between modules in a set of modules which are competing to access a resource or to perform an operation in a computer system. The invention also relates to apparatus for providing synchronous arbitration logic according to the method of the invention.

BACKGROUND OF THE INVENTION

In a computer system it is common to have several modules which must compete for system resources. For example, a computer system may have several input output (I/O) devices each of which need to be serviced at various times by a processor. Sometimes more than one such module may require servicing at the same time. To operate efficiently when several modules are contending for access to a resource, the computer system must have some method for determining which of the modules to service first. The process of selecting one module from a set of modules which are competing to access a certain resource or to perform a certain operation is called "priority arbitration".

Distributed arbitration mechanisms employ an arbitration bus, comprising of a number of bus lines. Each module is connected to the bus and is assigned a unique arbitration priority. The arbitration priority of each module is represented by a unique priority code which, in general, can serve as an address for the module. The process of priority arbitration identifies the contending module with the highest priority so that that module can be given first access to the resource.

During arbitration, each module applies logic values to the arbitration bus. The logic values applied by a particular module are determined by the priority code of the module and the logical state of the bus. After a delay, the logic values on the bus uniquely identify the contending module with the highest priority. This delay is determined by several factors including the delay through the logic components of arbitration logic as well as the time needed by the bus line to settle to a stable (binary) state.

Two major types of distributed priority arbitration mechanisms are: synchronous arbitration, which uses clocked arbitration logic; and asynchronous arbitration, in which the arbitration process is carried out by propagating signals through various stages of logic components and wires without using a clock. Asynchronous arbitration schemes must ensure that the arbitration process is purely combinational. In asynchronous arbitration schemes the arbitration bus and the arbitration logic of the modules connected to it must form an acyclic circuit. Feedback paths may introduce metastability and indefinite postponement of arbitration.

Taub, *Contention-resolving Circuits for computer Interrupt Systems* Proceedings of the IEEE, Vol 23., No. 9, September, 1976, pp. 845–850 describes a distributed priority arbitration technique. Taub's mechanism is asynchronous and requires a bus of width m=$\log_2 N$ bits to arbitrate among N modules in m units of bus-settling time. This arbitration scheme has gained popularity and is used in many modern bus systems, such as Futurebus+, M3-bus, S-100 bus, Multibus-II, Fastbus, and Nubus.

Kipnis, U.S. Pat. No. 5,101,482 describes another priority arbitration system. Kipnis' system is also asynchronous. The Kipnis system provides a trade-off between bus width (i.e. the number of bus lines in the bus) and arbitration time (i.e. the number of iterations needed to resolve contention). This trade-off is achieved by selecting the priority codes from a special group of code words which Kipnis calls "binomial codes". The number of 1-bits in a binomial code is not fixed and is often comparable to the length of the binomial code.

When the binomial codes have a length in bits equal to the number of bus lines m and the maximum number of intervals of consecutive 0-bits or consecutive 1-bits in the binomial codes (disregarding leading 0-bits) is t then the arbitration can be completed in t units of bus settling time. With the Kipnis system the number N of modules that may be connected to an arbitration bus is given by:

$$N \leq \sum_{q=0}^{t} \binom{m}{q} \qquad (1)$$

Other general discussions of asynchronous arbitration schemes can be found in Kipnis, *Priority Arbitration with Buses*, Proceedings if the MIT Conference on Advanced Research in VLSI, Cambridge Mass., 1990, pp 154–173 and Andrews, *Enhancing the Performance of Standard Buses*, Computer Design, September, 1991.

In prior art arbitration systems, the number of elementary components in a module's arbitration logic is proportional to the bus-width m. Furthermore, in many prior art systems, each module is connected to all bus lines (i.e. the number of bus lines connected to each module is m, and the number of modules per bus line is N). This reduces the performance of prior art arbitration systems because, in general, a bus line which is connected to many modules takes longer to settle to a steady state after it has been written to than a bus line which is connected to fewer modules. Other limitations of many prior art priority arbitration systems are: the design of the arbitration hardware depends upon bus width and, in some cases, the number of modules connected to the bus; and the fanin of certain logic gates in the systems can be as large as the bus width. This is undesirable because logic gates with a large fanin tend to be slower than equivalent logic gates with a smaller fan-in. While prior art systems can be designed with multi-level logic circuits to reduce fan-in to acceptable levels the propagation delay through such multi-level circuits is still a function of bus width.

SUMMARY OF THE INVENTION

This invention provides an improved method of priority arbitration among contending modules in a computer system comprising N modules $M_j$, and a bus for priority arbitration between said modules. The bus comprising a plurality of bus lines bus{1}, bus{2}, ..., bus{m}, wherein each module is identified by a unique m-bit priority code $P_j$, j=1, ..., N consisting of the bits $\rho_1^{(j)}, \rho_2^{(j)}, \ldots, \rho_m^{(j)}$. The method comprises the steps of:

a) Selecting codes $P_j$ from the set B(m,r) of bounded weight codes of length m and maximum weight r;

b) setting each bus line bus{i} to a 1 logic state if in any contending module, bit $\rho_i^{(j)}$=1;

c) performing a prefix-OR operation on the bus;

d) reading the bus and removing module $M_j$ from contention if (l<r AND $P_j\{1\}$=0 AND q=k+1 AND bus{1}=1) OR ($\rho_q$<m AND $P_j\{\rho_q+1\}$=0 AND bus{$\rho_q$+1}=1) where l is the weight of code $P_j$; k is the number of 1-intervals in the code $P_j$; and q is the number of times that said steps (b) and (c) have been executed; and e) iterating said steps (b), (c) and (d) until only a single module remains in contention.

The invention also provides a computer system comprising a plurality, N, of modules $M_j$; a wired-OR bus for priority arbitration between the modules; prefix-OR means operatively associated with the bus for transforming the state of the bus by switching all bus lines which are lower in order than any bus line which is in a logic 1 state to a logic 1 state; writing means associated with the modules for writing to the bus; reading means associated with the modules for reading from said bus; and logic means in each module associated with the reading means for switching the module into a non-active state conditionally upon values read by the reading means. The bus comprises a plurality of bus lines bus{1}, bus{2}, ..., bus{m}. Each of the modules has a unique m-bit priority code $P_j$, j=1, 2, ..., N consisting of the bits $\rho_1^{(j)}, \rho_2^{(j)}, \rho_m^{(j)}$. Each of the modules is switchable between an active state and a non-active state.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE PREFERRED EMBODIMENT

Figure 1:
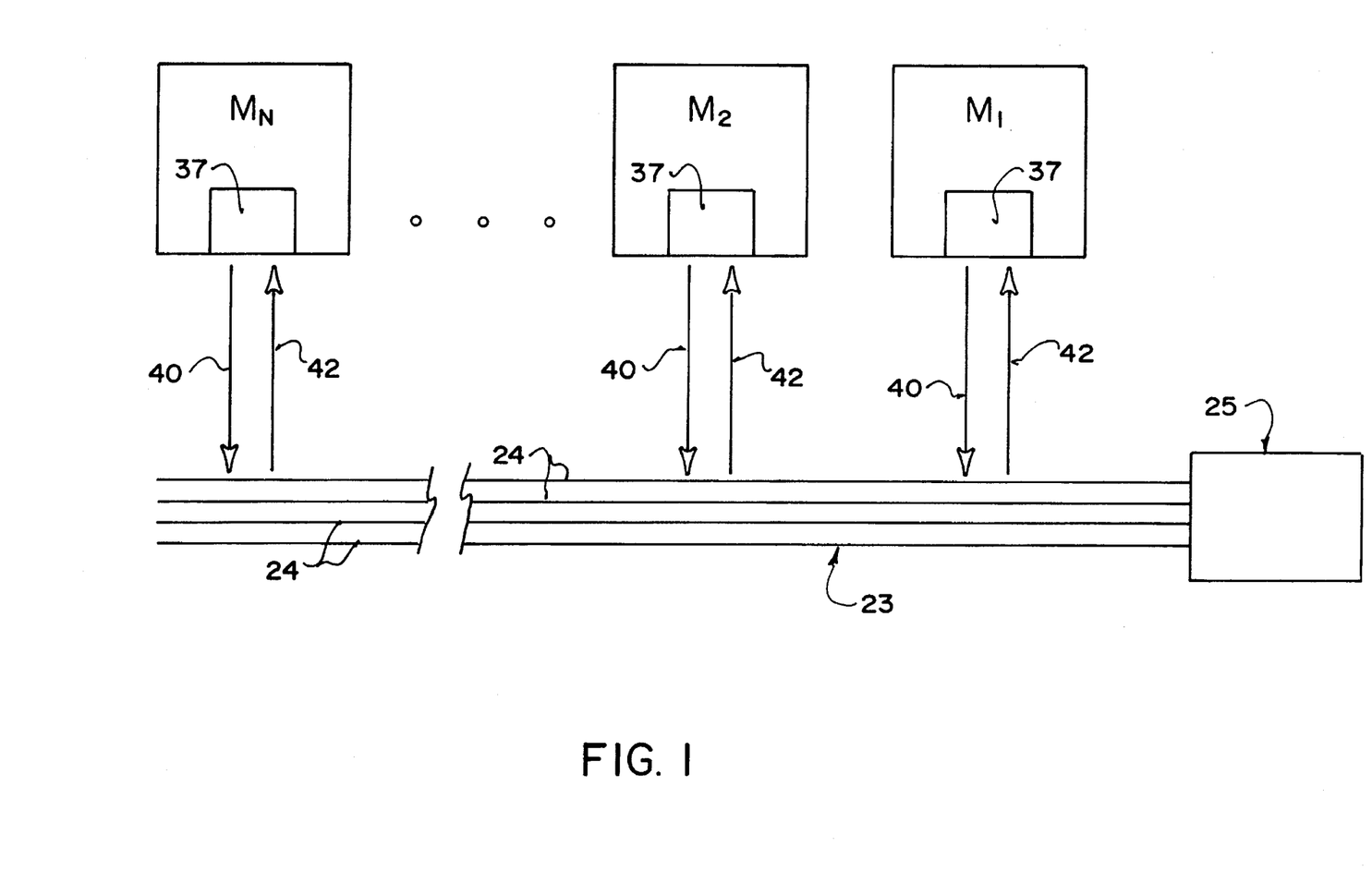
FIG. 1 is a block diagram of a computer system comprising a number of modules connected to a bus according to the invention.

As shown in FIG. 1, the invention provides for arbitration between a number (N) of modules $M_j$ connected to an arbitration bus 23. Modules $M_j$ may be processors in a multiprocessor computer system, peripheral or other I/O devices, or other devices in a computer system which compete for shared resources. An arbitration procedure is required because several modules $M_j$ may request simultaneous access to the same shared resource and the shared resource may not be able to service more than one module $M_j$ at one time. The arbitration procedure determines which of the modules $M_j$ which are contending to access a resource will be permitted first access to the resource.

Each module $M_j$ has a predetermined module priority which is encoded as a unique binary code $P_j$. The purpose of the arbitration procedure is to permit the module $M_j$ with the highest priority $P_j$ to access the shared resource before other modules $M_j$ with lower values of $P_j$. Each module $M_j$ has associated with it module arbitration logic 37. Modules $M_j$ are interconnected with bus 23 by write lines 40 and read lines 42, as discussed below.

Arbitration bus 23 comprises m bus lines 24. A prefix-OR unit 25, the operation of which is described below, is connected to arbitration bus 23. Arbitration bus 23 is constructed so that each bus line 24 carries the logical OR of the bits written on it. Each bus line 24 remains at logic level 0 unless one or more modules write a logic 1 value on it, in which case the bus line carries a logic 1 value. Bus 23 has m bus lines 24, one for each bit in codes $P_j$. Individual bus lines 24 are designated as bus{i}, where $1 \leq i \leq m$.

Binary codes $P_j$ are selected from the set of so called "bounded weight codes". That is, codes $P_j$ are selected so that the number of 1-bits in each code is not greater than a number r. The weight, l, of a binary string is defined as the number of 1-bits in the binary string. If we define B(m,r), where $0 \leq r \leq m$ as the set of all m-bit binary words in which each word has at most r bits equal to 1 and the remaining bits equal to 0, then, with a bounded-weight coding scheme, codes $P_j$ are selected from B(m,r).

In an alternative embodiment of the invention, codes $P_j$ are so called "constant-weight codes". In this case, we say that codes $P_j$ are selected from the set C(m,r), where $0 \leq r \leq m$ and C(m,r) denotes the set of all m-bit binary words in which each word has exactly r bits equal to 1 and the remaining m-r bits equal to 0. The number of code words in C(m,r) is given by the binomial coefficient:

$$N_c = \binom{m}{r} \quad (2)$$

As $B(m,r) = C(m,0) \cup C(m,1) \cup C(m,2) \cup 0 \ldots \cup C(m,r)$ the number of code words in B(m,r) is given by:

$$N_B(m,r) = \sum_{q=0}^{r} \binom{m}{q} \quad \text{where} \quad \binom{m}{0} = 1 \quad (3)$$

Since $C(m,r) \subseteq B(m,r)$, the arbitration methods of the invention will work with either constant-weight codes or bounded-weight codes. Using constant-weight codes allows the arbitration method to be simplified. On the other hand, for given values of m and r, there are more unique bounded-weight codes than there are unique constant weight codes. Thus, where a bounded-weight coding scheme is used, more modules can be connected to a bus of width m than when a constant-weight coding scheme is used. Since B(m,r) contains $N_B$ possible code words, and each module is assigned a unique code word, no more than $N_B$ modules may be connected to bus 23 (that is, $N \leq N_B$).

Codes $P_j$ which belong to the set B(m,r) are denoted as $P_1, P_2, \ldots P_{NB}$. The notation $P_j\{i\}$ denotes the $i^{th}$ bit of the code assigned to the $j^{th}$ module. Therefore, Pj{m} is the most significant bit of $P_j$ and $P_j\{1\}$ is the least significant bit of $P_j$.

The notation $\rho_i^{(j)}$ denotes the position, counting from the least significant bit of $P_j$, of the $i^{th}$ most significant 1-bit in $P_j$. Thus, $\rho_1^{(j)}$ is the position of the most significant 1-bit in $P_j$ and $\rho_1^{(j)} > \rho_2^{(j)} > \rho_3^{(j)} > \ldots > \rho_r^{(j)}$ if they all exist. If the code word $P_j$ has a weight l<r then, by convention, $\rho_{l+1}^{(j)} = \rho_{l+2}^{(j)} = \ldots = \rho_r^{(j)} = 0$. The superscript (j) will be omitted when it is not necessary for clarity. For example, for the code $P_j$=01010000 which is member of B(8,3), $\rho_1$=7, $\rho_2$=5 and $\rho_3$=0.

The "interval", k, of a bit string is defined as the number of intervals in the bit string which consist of one or more consecutive 1-bits. For example, the string 00111010111 has three such intervals. Each unbroken string of 1's in the string is a 1-interval. The number of 1-intervals in a binary string, b, is denoted by interval(b). For example, interval(0111001101101)=4.

The symbol $\sigma_i$ represents the position of the highest order bit in the $i^{th}$ most significant 1-interval in the bit string $P_j$, where $1 \leq i \leq k$ and k=interval($P_j$) (For example, for $P_j$= 00111011010, interval($P_j$)=3, $\sigma_1$=9, $\sigma_2$=5, and $\sigma_3$=2). We further define $\sigma_i$ so that, where $P_j \in B(m,r)$, if weight($P_j$)=l, interval($P_j$)=k, l<r, and $P_j\{1\}$=0 then $\sigma_{k+1}$=0. For example, if $P_j \in B(9,4)$ and $P_j$=000110000, then $\sigma_1$=6, and $\sigma_2$=0. In this case $\sigma_{k+1}$ is defined even though $P_j$ has only k intervals. Note that where $1 \leq i \leq k$, for any i, $P_j\{\sigma_i\}$=1 and $P_j\{\sigma_i+1\}$=0, except for the case where $\sigma_1$=m, in which case, $P_j\{\sigma_i+1\}$= $P_j\{m+1\}$ is undefined.

A sorted code is a binary word in which all of the 1-bits are consecutive and occupy the least significant positions in the binary word. For example, 000001111 is a sorted code. The notation S(m) will be used to denote the set of all sorted code words of length m. The set S(m) has m+1 members including $0^m$ and $1^m$, where $0^m$ and $1^m$ represent words made up of m consecutive 0's and m consecutive 1's respectively. The individual codes which are members of S(m) are designated as $S_t$ where t is the number of 1-bits in the code. For example, $S_3(8)$=00000111.

A code $P_a$ of length m is greater than another code $P_b$ also of length m if and only if there exists an $\chi$ in $1 \leq \chi \leq m$, such that $P_a$ and $P_b$ have the same m-$\chi$ most significant bits but $P_a\{\chi\}$=1 while $P_b\{\chi\}$=0.

ARBITRATION METHOD

Figure 2:
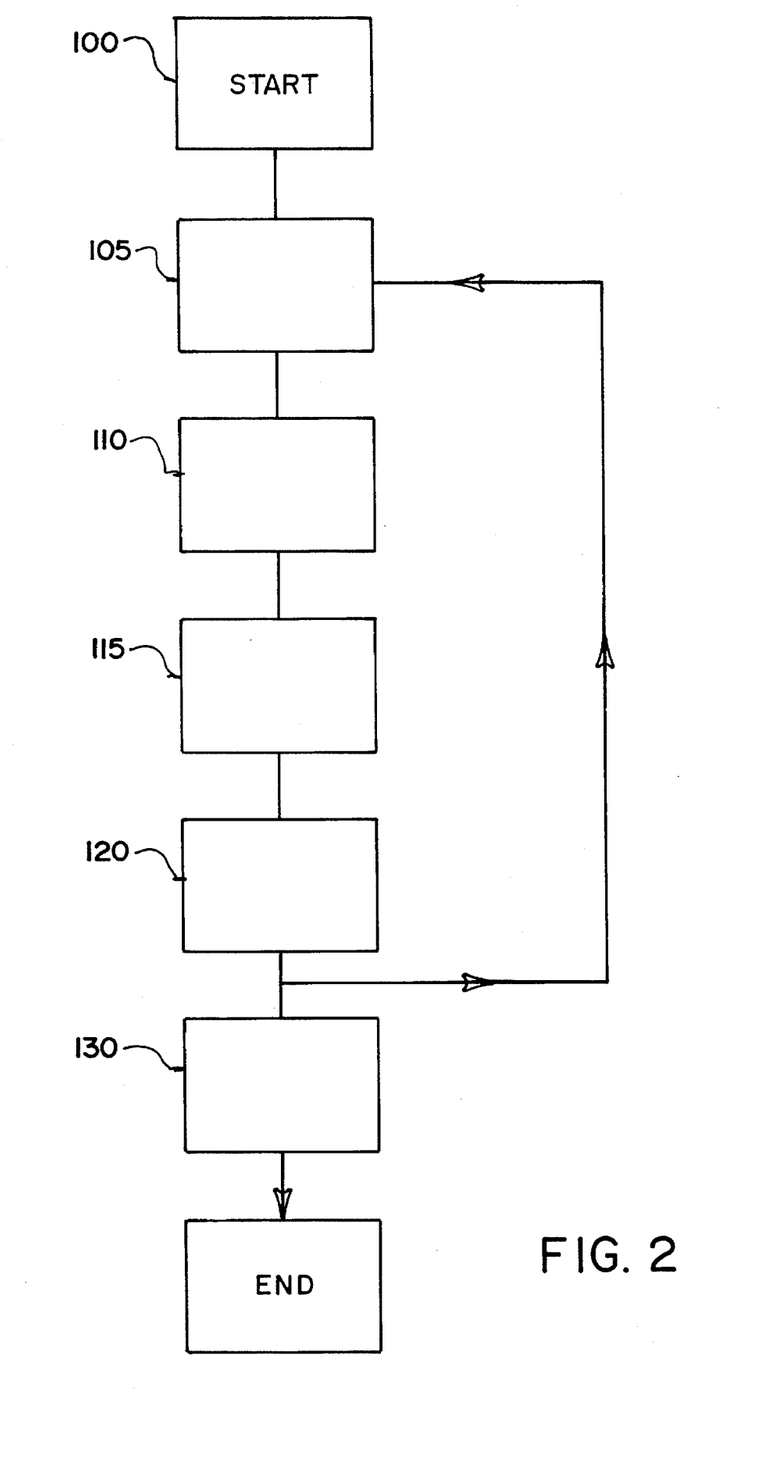
FIG. 2 is a flow chart for the method of arbitration according to the invention.

The arbitration process operates as shown in FIG. 2. When the arbitration process begins, at 100, each module $M_j$ has been assigned a code word $P_j \in B(m,r)$. Each code word $P_j$ has a weight $1 \leq r$ and an interval k. Each module $M_j$ has an ACTIVE flag to signal to the rest of the system when it is contending to use a resource. In step 100 the arbitration is triggered by a START signal which is generated by the computer system. At the end of step 100, the contending modules have their ACTIVE flags set. Other modules $M_j$ which are not requesting access to the resource may also be connected to bus 23. These non-contending modules $M_j$ do not have their ACTIVE flags set and do not take part in the arbitration process.

The arbitration process loops through steps 105 through 120 until the contending module with the highest priority code $P_j$ has been uniquely identified. The number of the current iteration is represented by q, q=1,2, . . . r. A maximum of r iterations of steps 105 through 120 is needed to uniquely identify the contending module with the highest priority code $P_j$.

As described below, during each iteration some contending modules may be removed from contention and will have their ACTIVE flags set off. These modules become inactive and do not take part further in the arbitration. We define $A_q$ to be the set of modules $M_j$ remaining in contention after the $q^{th}$ iteration of the arbitration procedure. $A_0$ is the initial set of contending modules $M_j$. Similarly, $A_1, A_2 \ldots$ are the sets of modules remaining in contention after the first, second, and successive iterations of steps 105 through 120.

In step 105, each module $M_j$ writes a bit $P_j\{\rho_q\}$ on bus line bus$\{\rho_q\}$. Next, in step 110, a prefix-OR operation is performed on bus 23. The prefix-OR operation maps a bounded-weight code from B(m,r) (or a constant-weight code from C(m,r)) onto a corresponding sorted code from S(m). The transformation is defined as follows:

$$\forall P_j \in B(m,r) \; H(P_j)=S(r) \Leftrightarrow r=\lambda_m(P_j) \quad (4)$$

$\lambda_m(P_j)$ is a function with an integer value that returns the position of the highest order 1-bit in the code word $P_j$, as counted from the lowest order bit of $P_j$. For example, if $P_j$32 001010001, then $H(P_j)$=001111111=$S_7$.

After the prefix-OR operation in step 110, which may be performed simultaneously with writing step 105, comes a first reading step 115. During step 115 each module $M_j$ may read bus line bus$\{1\}$. Module $M_j$ reads bus line bus$\{1\}$ if, for code $P_j$, l<r AND $P_j\{1\}$=0 AND q=k+1. If bus$\{1\}$=1 then the module $M_j$ removes itself from contention (i.e. turns its ACTIVE flag off). It can be seen that step 115 may be omitted if codes $P_j$ are constant weight codes because, for constant weight codes, l=r so the condition l<r is never satisfied. If bus$\{1\}$=0 then module $M_j$ remains in contention (i.e. its ACTIVE flag remains set) and the arbitration process continues.

After step 115 comes a second reading step 120. Steps 115 and 120 may be performed simultaneously. During step 120 each module $M_j$ may read one of bus lines bus$\{i\}$. If $P_j\{\rho_q+1\}$=0 AND $\rho_q$<m then module $M_j$ reads bus$\{\rho_q+1\}$= 0. If bus$\{\rho_q+1\}$=1 then the module $M_j$ removes itself from contention (i.e. turns its ACTIVE flag off). If bus$\{\rho_q+1\}$=0 then module $M_j$ remains in contention (i.e. its ACTIVE flag remains set) and the arbitration process continues. An advantage of the invention is that during read steps 115 and 120 each module only needs to read a single line of bus 23.

This arbitration process will always end with only a single module $M_j$ remaining in contention after, at most, r iterations of steps 105 through 120. In step 130 the "winning" module (i.e. the sole member of set $A_r$) writes its code word onto bus 23. The computer system can then use the value on bus 23, in conventional ways, to permit the winning module to access the shared resource.

The arbitration process can be summarized by the following pseudo-code, in which text following a % sign is a comment:

```
Procedure ARBITRATE{m,r}
100 begin
      if j ∈ A₀ then ACTIVE(j)←1    % Each module Mⱼ has a
                                     % code word Pⱼ with
                                     % weight l and interval k.
      h←1+Pⱼ{m}                     % h is an index.
      for q=1 to m do
      begin
105.  Each module Mⱼ, where j ∈ A_{q-1} writes bit Pⱼ{ρ_q} on
      bus line bus{ρ₁}.
110.  Perform prefix-OR operation on bus 23.
115.  If (l<r AND Pⱼ[1]=0) AND q=k+1 then module
      Mⱼ reads bus{1}. If bus {1}=1 then ACTIVE(j)←0.
120.  If (ρ_q<m AND Pⱼ{ρ_q+1}=0) then module
      Mⱼ performs the following:
      begin
      120A. Read bus{ρ_q+1}.   If bus{ρ_q+1}=1 then
                                ACTIVE(j)←0.
      120B. Perform h←h+1.
      end
      end
130.  Upon completion of the arbitration procedure, only the
      module with the highest priority remains active. This
      module can then write its priority code on bus 23, if
      needed.
end
```

Procedure ARBITRATE consists of, at most r iterations. In the $q^{th}$ iteration all competing (active) modules $M_j$ examine position $\rho_q$ of their priority code $P_j$. Only those modules with the maximum such position remain active. In the first iteration (q=1) all modules for which $\rho_1$=m (i.e. all modules in which the highest order bit of $P_j$ is 1) do not execute step 120 because for such modules the condition $\rho_1$<m is not satisfied. These modules remain active throughout the first iteration regardless of the status of bus lines 24 and do not need to read bus 23 during the first iteration of the arbitration procedure.

To understand procedure ARBITRATE consider that since the codes $P_j$ assigned to modules $M_j$ are unique, one of modules $M_j$ will have a code which is greater than the codes of any of the other contending modules. We define $P_{max} = {}^{max}_{i \in A_0}\{P_i\}$, and let $\rho_1^{max}, \rho_2^{max}, \ldots, \rho_r^{max}$ denote the positions of the 1-bits in $P_{max}$. Each iteration q starts by each contending module $M_j$ writing a 1 on bus line bus$\{\rho_q\}$ (step 105). $\rho_q$ may be different for different modules. After a delay, to allow bus 23 to settle, each bus line will carry the logical OR of all of the signals written to that bus line by all of modules $M_j$. Prefix-OR circuit 25 then converts the binary code written on bus 23 to a sorted code which is placed back on bus 23 (step 110). If the state of bus 23 is represented by a vector $BUS_m$ then, after step 110 in iteration q, $\lambda_m(BUS_m) = \rho_q^{max}$ and $BUS_m = S_{(\rho_q^{max})}$. In iteration q, each active module reads bus$\{\rho_q+1\}$ only if $P_j\{\rho_q+1\} = 0$. If $P_j\{\rho_q+1\} = 0$ and bus$\{\rho_q+1\} = 1$ then $P_j$ has $\rho_q < \rho_q^{max}$ and consequently, module $M_j$ cannot win the arbitration. Therefore, procedure ARBITRATE calls for module $M_j$ to become inactive under these circumstances (step 120A).

For procedure ARBITRATE to work, all of the bits on bus 23 higher in order than $\rho_q^{max}$ must be 0 in iteration q. It can be proven by induction on the variable q that this will always be the case. That is, it can be proven that at the end of iteration q, $1 \leq q \leq r$, all active modules will have priority codes having the property $\rho_1 = \rho_1^{max}$, $\rho_2 = \rho_2^{max}$, $\ldots$, $\rho_q = \rho_q^{max}$ i.e. the q highest order bits in the priority codes in all modules which remain active after iteration q are identical and are identical to the q highest order bits in $P_{max}$.

Consider the case q=1. Then, following execution of step 120A, only modules with the largest $\rho_1$ remain active. All modules for which $\rho_1 < \rho_1^{max}$ will find the condition $BUS\{\rho_1+1\} = 1$ in step 120A to be satisfied because $BUS_m = S_{(\rho_q^{max})}$ and $\rho_1 + 1 \leq \rho_1^{max}$. Those modules for which $\rho_1 < \rho_1^{max}$ therefore remove themselves from contention and disable their ACTIVE flags during step 120A. Thus, the only modules that survive the first iteration are those modules with $\rho_1 = \rho_1^{max}$. It can be similarly seen that at the end of iteration q=r only modules with $P_j = P_{max}$ remain in contention. However, because each module has a unique priority code, the arbitration procedure ends with only one module remaining in contention (i.e. $A_r$ is a singleton).

The time required to complete the arbitration procedure of the invention is at most r units, where one unit of time is the time required for one iteration of the procedure. Each iteration comprises a write operation (step 105), a bus prefix-OR operation (step 110), and a read operation followed by the activity to update the status of each module (steps 115 and 20). Each unit of time is dominated by the time required for bus lines 24 to settle to a stable state after the write operation of step 105 is completed.

APPARATUS

Techniques for implementing bus 23 are well known. For example, bus 23 may be an open-collector bus, a precharged bus or any other bus which achieves a "wired OR" function. It is worth noting that in most practical such buses, a logic level of 0 refers to a higher bus voltage level and a logic level of 1 refers to a lower bus voltage level. If bus 23 is implemented in CMOS technology then a precharged circuit may be used to pull up the bus to a selected logic level before each write-then-read iteration.

Figure 3:
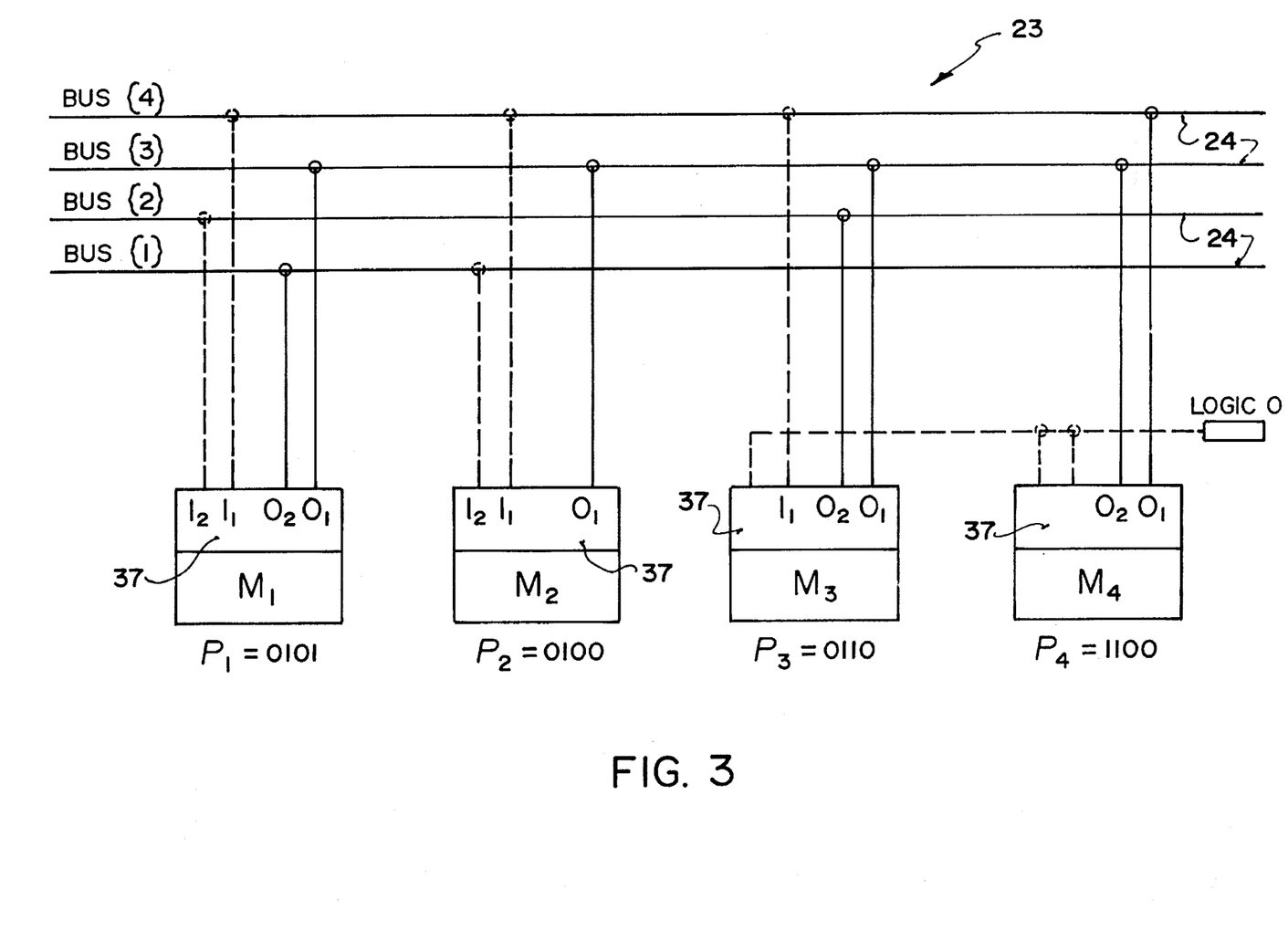
FIG. 3 is a schematic diagram showing arbitration circuitry for arbitrating between four modules according to the invention.

As shown in FIGS. 1 and 3, prefix-OR unit 25 is connected to the m bus lines 24 of bus 23. Prefix-OR unit 25 reads bus 23 and writes a transformed value onto bus 23 as defined by Equation (4).

Figure 4:
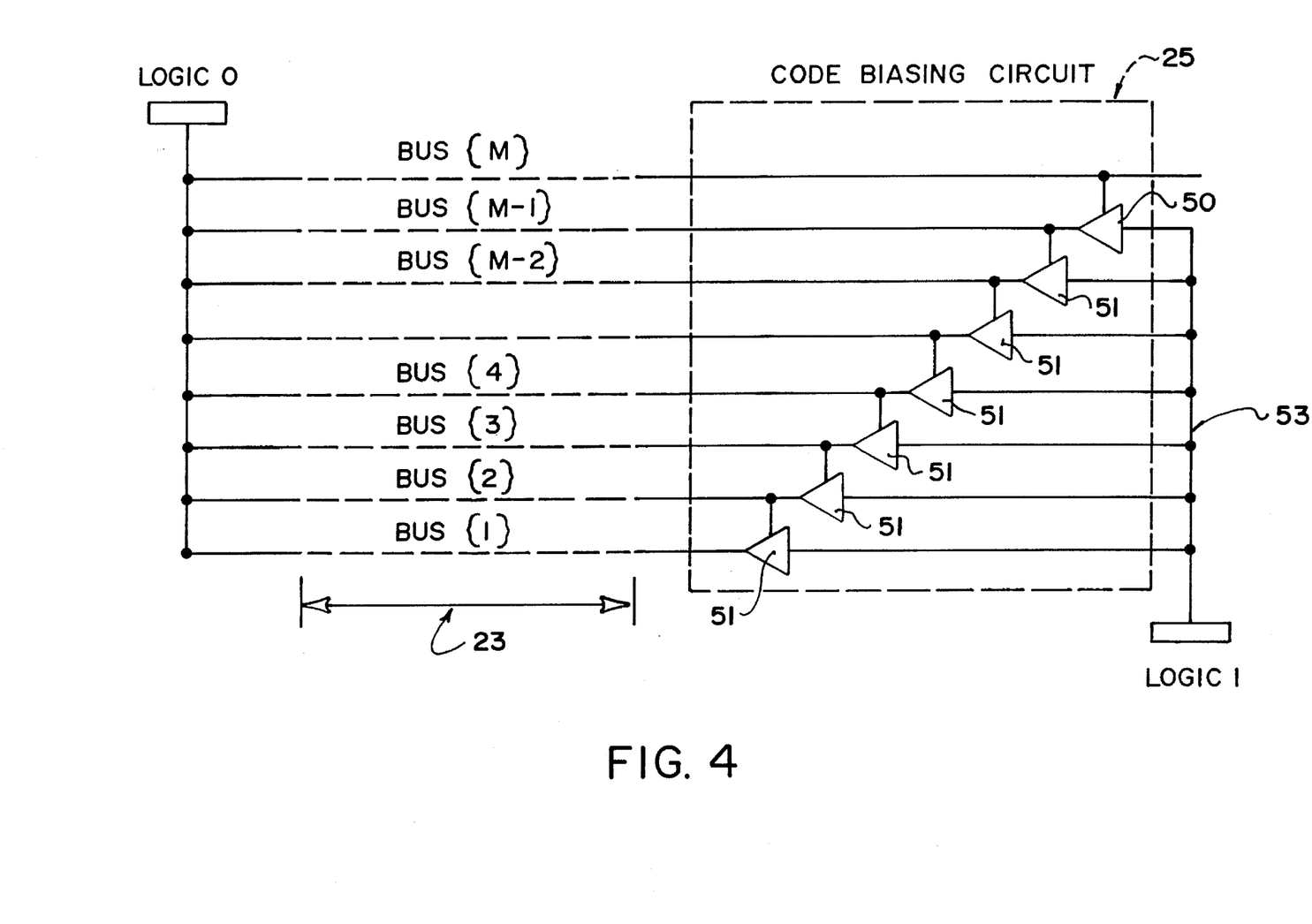
FIG. 4 is a schematic diagram of a prefix-OR unit according to the invention.

Prefix-OR unit 25 may, for example, be constructed in the simple manner shown in FIG. 4 using a cascade of tri-state buffers 50, 51. The first tri-state buffer 50 is connected between bus line bus$\{m-1\}$ and a line 53 which is set to a voltage representing a logical 1. The input of tri-state buffer 50 is connected to bus line bus$\{m\}$. Subsequent tri-state buffers 51 are connected between line 53 and bus lines bus$\{m-2\}$, bus$\{m-3\}$, $\ldots$, bus$\{1\}$ respectively. The input to each of tri-state buffers 51 is connected to the bus line one higher in order than the output of that tri-state buffer 51. For example, the tri-state buffer 51 which is connected between line 53 and bus line bus$\{3\}$ has an input connected to bus line bus$\{4\}$. It can be seen that with prefix-OR unit 25 connected to bus 23, if any bus line, bus$\{i\}$, is set to a logic value of 1, then all of bus lines 24 which are lower in order than bus$\{i\}$ will also be set to a logic value of 1. Prefix-OR unit 25 may be implemented using alternative circuitry to optimize design parameters, such as bus-settling delay. Since there is only one prefix-OR unit on bus 23 prefix-OR unit 25 may use powerful bus drivers or other circuit optimization techniques to reduce the settling time of bus 23 without causing the overall system to be excessively expensive.

Figure 5:
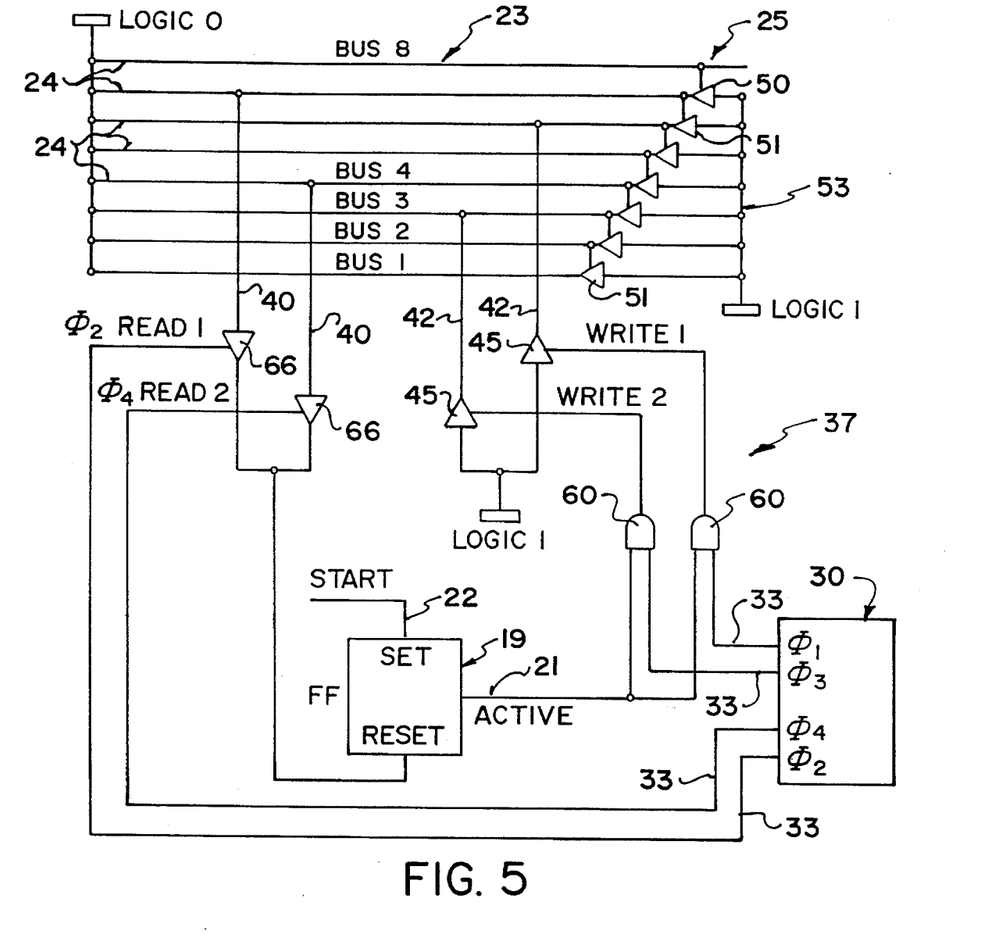
FIG. 5 is a schematic diagram of the arbitration logic circuitry in module having the priority code 00100100.

FIG. 5 shows the circuitry for arbitration logic units 37 in modules $M_j$ according to the invention. The system of FIG. 5 uses codes $P_j$ selected from the set B(8,2). From the foregoing, it is easy to generalize to other values for m and r. As shown in FIG. 3, the arbitration logic circuits 37 in modules $M_j$ are connected to bus lines 24 by read lines 40 and write lines 42. For each module $M_j$ a maximum of r read lines 40 and r write lines 42 are required to practise the invention. Each one of modules $M_j$ has assigned to it a unique priority code $P_j$.

Each module $M_j$ has a latch 19 with an output 21 which serves as an ACTIVE flag. When one of modules $M_j$ needs to access a shared resource it transmits a request signal on a control line (not shown). The signal generated by module $M_j$ results in the issuance of a START signal 22 after the completion of some intermediate steps. When START signal 22 is applied to latch 19, latch 19 is set and ACTIVE flag 21 is at a logic 1 state. The START signal is applied to latch 19 through a gate (not shown) so that latch 19 is set only in those modules which require access to the shared resource.

Each module $M_j$ is connected to bus 23 by l write lines 42 which are designated as $O_1, O_2, \ldots O_l$, where l is the weight of $P_j$. All of write lines $O_1, O_2, \ldots O_l$ are normally either in a logic "0" state or isolated from bus 23. Preferably, write lines 42 are connected to bus lines 24 through controllable devices 45 such as tri-state buffers. In this way, module $M_j$ can write a 1 on the bus line to which write line $O_i$ is connected by setting write line $O_i$ to a logic level of 1. Otherwise (i.e. if $O_i=0$), write line $O_i$ is isolated from bus 23 and does not unnecessarily load bus 23.

The connections of write lines 42 to bus lines 24 depend upon the code word $P_j$ assigned to each module $M_j$ as follows. In each module $M_j$, each output line $O_i$ is connected to bus line bus$\{\rho_i\}$, $1 \leq i \leq l$. Module $M_j$ is connected by write lines 42 only to as many of bus lines 24 as there are 1-bits in the code word $P_j$ which has been assigned to module $M_j$.

For example, FIG. 3 shows the interconnection of four modules $M_1$, $M_2$, $M_3$ and $M_4$ connected to an arbitration bus having a width m=4. Modules $M_1$, $M_2$ $M_3$ and $M_4$ have been assigned the codes 0101, 0100, 0110 and 1100 respectively. These codes all belong to the set B(4,2). It can be seen that for each module there is a 1:1 correspondence between the bits in the code $P_j$ assigned to that module and the connections of write lines 42 to bus lines 24 correspond to the positions of the 1-bits in the codes. Read lines 40 are connected to bus lines 24 which correspond to bit positions 1 bit higher in order than the highest order bit of each 1-interval in $P_j$. Module $M_4$ does not need to read any bus lines because its code $P_4$=1100 has the highest priority in B(4,2). Consequently, module $M_4$ will win the arbitration whenever it is contending.

Figure 6:
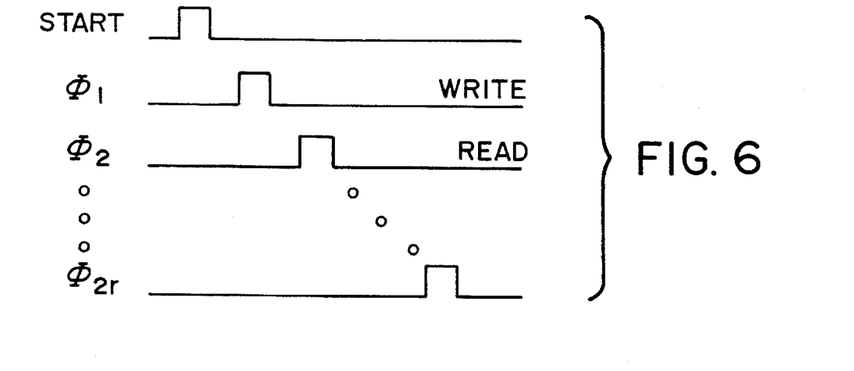
FIG. 6 is a timing diagram for a multi-phase clock for synchronizing arbitration in apparatus according to the invention.

The arbitration process is synchronous and may be conveniently coordinated by a 2r phase clock 30 having 2r clock lines 33 designated as $\Phi_1, \Phi_2, \Phi_3, \ldots, \Phi_{2r}$. The timing of signals on clock lines 33 is shown in FIG. 6. As shown in FIG. 5, write lines 42 are each connected to the output of an AND gate 60 which has one input connected to the ACTIVE flag 21 of module $M_j$ and a second input connected to clock line $\Phi_n$, where n is an odd integer. That is, clock line $\Phi_1$ is connected to an input of AND gate 60 of write line $O_1$, clock line $\Phi_3$ is connected to an input of AND gate 60 of write line $O_2$, clock line $\Phi_5$ (not shown) is connected to an input of AND gate 60 of write line $O_3$, and so on. In this way, write line $O_i$ writes a 1 on a line of bus 23 if the module is active and if the corresponding clock line $\Phi_{2n-1}$ is at a logic 1 level. Otherwise, write line $O_i$ is isolated from bus 23 by tri-state buffer 45.

Each module $M_j$ is also connected to bus 23 by zero, one, or more read lines 40 which are designated as $I_h$. The connections of read lines $I_h$ to bus lines 24 are determined for each module $M_j$ by the code $P_j$ assigned to that module $M_j$.

Read lines $I_h$ are connected to bus lines 24 as follows. In each module $M_j$, each read line $I_h$ is connected to bus line bus$\{\sigma_h+1\}$, $1 \leq h \leq k+1$. However, if $\sigma_1=\rho_1=m$ then read line $I_1$ is not used, since there is no bus$\{m+1\}$. Furthermore, read line $I_{k+1}$ is connected to bus$\{1\}$ only if weight($P_j$)<r and $P_j\{1\}$=0. Otherwise, $I_{k+1}$ need not be connected to any one of bus lines 24. In the cases defined above where read lines $I_1$ or $I_{k+1}$ are not connected to any of bus lines 24, such read lines would not affect the outcome of the arbitration procedure. Those read lines which are not connected to bus 23 are simply set to a logic value of 0 so that the module remains in contention during any step when those read lines are read. Depending upon the values of $P_j$ for the modules connected to bus 23, some of bus lines 24 may never be read or written to. Such bus lines may be omitted without affecting the operation of the invention. Omitting such bus lines would limit the addition of new modules to the bus because only modules with values of $P_j$ which did not require the omitted bus lines to be either read or written to could be added.

Each read line is connected to the RESET input of latch 19 through a tri-state buffer 66. The control inputs of tri-state buffers 66 are connected to even numbered clock lines 33. That is, the control input of the tri-state buffer on read line $I_1$ is connected to clock line $\Phi_2$, the control input of the tri-state buffer on read line $I_2$ is connected to clock line $\Phi_4$, the control input of the tri-state buffer on read line $I_n$ is connected to clock line $\Phi_{2n}$, and so on. It can be seen that if an input $I_n$ in a module $M_j$ is connected to a bus line which has a logic level of 1 and, at the same time, clock line $\Phi_{2n}$ has a logic level of 1, then latch 19 will be reset. When latch 19 is reset the ACTIVE flag for module $M_j$ is set off and module $M_j$ takes no further part in the arbitration.

As discussed above, $N_B(m,r)$ is the maximum number of competing modules that can be handled in r units of time on an arbitration bus of width m bits in a bus system in which priority codes are assigned to modules from the set B(m,r). $L_B(m,r)$ is the total number of write lines 42 which are connected to the same bus line 24. It can be shown that:

$$L_B(m,r) = \sum_{q=0}^{r-1} \binom{m-1}{q} = N_B(m-1, r-1) \quad (8)$$

Since $N_B(m-1,r-1) < (r/m)N_B(m,r)$, and r/m is a fraction which is smaller than 1, the method of the invention requires the connection of a smaller number of modules to each bus line (i.e. the method provides less bus loading) than many prior art methods.

Table I lists $L_B$ for various values of m and r. It can be seen that bus loading can be reduced by increasing m, by decreasing r, or by both increasing m and decreasing r. In general it is desirable to reduce $L_B$ because decreasing the number of modules connected to the same bus line increases the switching speed of the bus line and speeds the arbitration.

Table I also shows the arbitration time and the number of logic units required for each scheme. The arbitration time is proportional to r. The number of elementary components (i.e. logic components that process only a single bit of data at a time) in the arbitration logic per module is also proportional to r. It can be seen that faster arbitration circuits require fewer logic components per module. The cost of achieving faster arbitration in this case is a wider bus which implies a larger prefix-OR unit 25. However the system requires only one prefix-OR unit 25 and prefix-OR unit 25 has a simple function which can be easily expanded and optimized.

It can be appreciated that each module has a fixed amount of arbitration logic which is independent of the number of modules connected to the bus. The hardware complexity of the arbitration logic per module is dependent only on the priority code assigned to the module. The arbitration logic in all modules is identical. The arbitration logic in the modules differs only in which subset of bus lines each module is connected to. Modules can therefore be designed with a fixed arbitration hardware with

TABLE I

| Code Set | N | m | $L_B$ | Arbitration Time | Logic Per Module |
|---|---|---|---|---|---|
| B(4,2) | 11 | 4 | 4 | 2 | 4 |
| B(5,2) | 16 | 5 | 5 | 2 | 4 |
| B(6,2) | 22 | 6 | 6 | 2 | 4 |
| B(6,3) | 42 | 6 | 16 | 3 | 4 |
| B(7,2) | 29 | 7 | 7 | 2 | 4 |
| B(7,3) | 64 | 7 | 22 | 3 | 6 |
| B(8,2) | 37 | 8 | 8 | 2 | 4 |
| B(8,3) | 93 | 8 | 29 | 3 | 6 |
| B(8,4) | 163 | 8 | 64 | 4 | 8 |
| B(9,2) | 46 | 9 | 9 | 2 | 2 |
| B(9,3) | 130 | 9 | 37 | 3 | 6 |
| B(9,4) | 256 | 9 | 93 | 4 | 8 |
| B(10,2) | 56 | 10 | 10 | 2 | 4 |
| B(10,3) | 176 | 10 | 46 | 3 | 6 |
| B(10,4) | 386 | 10 | 130 | 4 | 8 |
| B(10,5) | 538 | 10 | 256 | 5 | 10 |
| B(11,2) | 67 | 11 | 11 | 2 | 4 |
| B(11,3) | 232 | 11 | 56 | 3 | 6 |
| B(11,4) | 562 | 11 | 176 | 4 | 8 |
| B(11,5) | 1024 | 11 | 386 | 5 | 10 | a design independent of both the bus-width m and the number N of modules connected to the same arbitration bus. Module priorities can be reprogrammed by simply reconfiguring the connections of the modules to the arbitration bus.

The system can be implemented so that the fan-in (the number of inputs) of any elementary logic gate in the arbitration logic is at most 2 (i.e. all gates have two inputs at the most). The logic that evaluates the priority status of a module can be realized with one level of tri-state switches. The number of module-to-bus connections is independent of the number of modules connected to the bus.

It can be appreciated that the following tradeoffs can be achieved in arbitration systems according to the invention:

1. Arbitration time can be reduced by increasing bus-width and reducing r while leaving the number of modules constant.
2. Arbitration logic per module can be reduced by increasing bus-width and reducing r while leaving the number of modules constant.
3. The number of modules can be increased indefinitely by increasing only bus-width, but while keeping arbitration time and arbitration logic fixed (i.e. while keeping r fixed).
4. The number of modules connected to each bus line can be reduced by increasing bus-width.

As will be apparent to those skilled in the art in the light of the foregoing disclosure, many alterations and modifications are possible in the practice of this invention without departing from the spirit or scope thereof. By way of example only, the components of the circuits described above may be replaced with functional equivalents, prefix-OR unit 25 may incorporate alternative currently known prefix-OR circuits which meet design criteria and are compatible with the bus being used, or the prefix-OR operation may be implemented by reading bus 23 and writing transformed values to bus lines 24 under software control.

Accordingly, the scope of the invention is to be construed in accordance with the substance defined by the following claims.

What is claimed is:

1. An improved method of priority arbitration among contending modules in a computer system comprising a number of modules $M_j$, connected to a bus, said bus comprising a plurality of bus lines bus$\{1\}$, bus$\{2\}$, . . . , bus$\{m\}$, wherein each module is identified by a unique m-bit priority code $P_j$, j=1, . . . , N consisting of the bits $\rho_1^{(j)}$, $\rho_2^{(j)}$, . . . , $\rho_m^{(j)}$, said method comprising the steps of:

a) selecting each of said codes $P_j$ from a set consisting of bounded weight codes of length m and maximum weight r,
   b) setting each bus line bus$\{1\}$ to a 1 logic state if, in any contending module, bit $\rho_l^{(j)}$ is the highest order 1-bit in code $P_j$;
   c) performing a prefix-OR operation on said bus;
   d) reading said bus and, for each of said modules $M_j$, removing said module $M_j$ from contention if, for said module, (l<r AND $P_j\{1\}$=0 AND q=k+1 AND bus$\{1\}$=1) OR ($\rho_q$<m AND $P_j\{\rho_q+1\}$=0 AND bus$\{\rho_q+1\}$=1) where: AND represents a logical AND operation; OR represents a logical OR operation; l is the weight of code $P_j$; k is the number of 1-intervals in the code $P_j$; and q is the number of times that said steps (b) and (c) have been executed; and
   e) iterating said steps (b), (c) and (d) for 1-bits in $P_j$ sequentially lower in order than said highest order 1-bit until only a single module remains irk contention.

2. The method of claim 1 wherein said set consists of constant weight codes of length m and weight r with r<m.

3. The method of claim 2 wherein said step (d) consists of removing all those of said modules $M_j$ from contention for which the condition $\rho_q$<m AND $P_j\{\rho_q+1\}$=0 AND bus$\{\rho_q+1\}$=1 is satisfied.

4. A computer system comprising:

a) a plurality, N, of modules $M_j$, each of said modules having a unique m-bit priority code $P_j$, j=1, 2, . . . , N consisting of the bits $\rho_1^{(j)}$, $\rho_2^{(j)}$, . . . , $\rho_m^{(j)}$; said bits comprising r or fewer 1-bits, where r is an integer and r<m, each of said modules switchable between an active state and a non-active state;
   b) a wired-OR bus comprising a plurality of bus lines bus$\{1\}$, bus$\{2\}$, . . . , bus$\{m\}$,
   c) prefix-OR means operatively associated with said bus for transforming the state of said bus from an initial state to a transformed state by setting to a logic 1 state all of said bus lines which are lower in order than any bus line which, in said initial state, is in a logic 1 state; each of said modules comprising:
   d) writing means for placing said bus in an initial state by writing a logic "1" to a first one of said bus lines corresponding to a 1-bit in said priority code when said module is in said active state;
   e) reading means for reading a state of a second one of said bus lines, higher in order than said first one of said bus lines, from said bus when said bus is in said transformed state; and
   f) logic means for switching said module into a non-active state when said reading means reads a logic "1" on said second one of said bus lines;

said computer system comprising sequencing circuitry for sequentially operating said writing means, said prefix-OR means and said reading means.

5. The system of claim 4 wherein, in each of a plurality of said modules, said reading means comprises one or more read lines $I_h$, said read lines connected to said bus lines bus$\{\sigma_h+1\}$, $1 \leq h \leq k+1$ where $\sigma_h$ is the position of the highest order 1-bit in the $h^{th}$ most significant 1-interval in the code $P_j$ for said module.

6. The system of claim 5 wherein said reading means in each of said modules comprises no more than r of said input lines.

7. The system of claim 4 wherein said writing means comprise output lines $O_i$ connected between said modules $M_j$ and said bus, wherein each of said output lines $O_i$ is connected to bus line bus$\{\rho_i^{(j)}\}$, $1 \leq I \leq l$.

8. The system of claim 7 wherein, in each of a plurality of said modules, said reading means comprises one or more read lines $I_h$, said read lines connected to said bus line bus$\{\sigma_h+1\}$, $1 \leq h \leq k+1$, where $\sigma_h$ is the position of the highest order bit in the $h^{th}$ most significant 1-interval in the code $P_j$ for said module, k is the number of 1-intervals in said code $P_j$ and $\sigma_{k+1} \equiv 0$.

9. The system of claim 7 wherein said writing means in each of said modules comprises no more than r of said output lines.

* * * * *